United States Patent
Marchant

(10) Patent No.: US 8,079,025 B2
(45) Date of Patent: Dec. 13, 2011

(54) ASYNCHRONOUS LOAD OF SOURCE DEPENDENCIES

(75) Inventor: Benoit Marchant, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1140 days.

(21) Appl. No.: 11/811,020

(22) Filed: Jun. 8, 2007

(65) Prior Publication Data

US 2008/0307394 A1 Dec. 11, 2008

(51) Int. Cl.
*G06F 9/44* (2006.01)
(52) U.S. Cl. ......... 717/166; 717/115; 717/178; 709/219
(58) Field of Classification Search .................. 717/115, 717/166, 178; 709/219
See application file for complete search history.

(56) References Cited

U.S. PATENT DOCUMENTS

| | | | |
|---|---|---|---|
| 5,481,712 A | 1/1996 | Silver et al. | |
| 5,682,536 A | 10/1997 | Atkinson et al. | |
| 5,754,795 A * | 5/1998 | Kuhlman et al. | 709/236 |
| 5,822,580 A | 10/1998 | Leung | |
| 5,842,020 A | 11/1998 | Faustini | |
| 5,872,973 A | 2/1999 | Mitchell et al. | |
| 5,953,524 A | 9/1999 | Meng et al. | |
| 6,083,276 A | 7/2000 | Davidson et al. | |
| 6,182,281 B1 | 1/2001 | Nackman et al. | |
| 6,301,557 B1 * | 10/2001 | Miller et al. | 704/223 |
| 6,442,754 B1 * | 8/2002 | Curtis | 717/175 |
| 6,557,164 B1 | 4/2003 | Faustini | |
| 6,615,342 B1 | 9/2003 | Bopardikar et al. | |
| 6,678,882 B1 | 1/2004 | Hurley et al. | |
| 6,754,885 B1 | 6/2004 | Dardinski et al. | |
| 6,785,882 B1 | 8/2004 | Goiffon et al. | |
| 6,826,745 B2 | 11/2004 | Coker et al. | |
| 6,983,446 B2 | 1/2006 | Charisius et al. | |
| 7,093,231 B2 | 8/2006 | Nuss | |
| 7,207,002 B2 | 4/2007 | Mireku | |
| 7,293,254 B2 | 11/2007 | Bloesch et al. | |
| 7,340,722 B2 | 3/2008 | Dencker et al. | |
| 7,379,977 B2 * | 5/2008 | Walrath | 709/219 |
| 7,437,734 B2 | 10/2008 | Rees et al. | |
| 7,496,892 B2 | 2/2009 | Nuss | |
| 7,506,248 B2 * | 3/2009 | Xu et al. | 715/240 |
| 7,509,584 B2 * | 3/2009 | Moser | 715/760 |
| 7,539,982 B2 | 5/2009 | Stuart | |
| 7,546,602 B2 | 6/2009 | Hejlsberg et al. | |
| 7,603,651 B2 | 10/2009 | De Brabander | |
| 7,627,854 B2 | 12/2009 | Burner et al. | |
| 7,689,665 B2 * | 3/2010 | Lipton et al. | 709/217 |
| 7,725,574 B2 * | 5/2010 | O'Connell et al. | 709/224 |

(Continued)

OTHER PUBLICATIONS

Murray, "Asynchronous JavaScript Technology and XML (AJAX) With Java 2 Platform, Enterprise Edition", 2005.*

(Continued)

*Primary Examiner* — Wei Zhen
*Assistant Examiner* — Phillip Nguyen
(74) *Attorney, Agent, or Firm* — Van Pelt, Yi & James LLP

(57) ABSTRACT

Asynchronous loading of source dependencies is disclosed. An indication is received in the course of executing a script that a source file on which a current class or function depends is not available. Execution of remaining portions of the script, if any, that do not depend on the source file, continues, or other processing tasks are performed if no such portions remain, while the source file is loaded asynchronously.

39 Claims, 9 Drawing Sheets

U.S. PATENT DOCUMENTS

| | | | |
|---|---|---|---|
| 7,827,527 | B1 | 11/2010 | Chiluvuri |
| 7,844,956 | B2 | 11/2010 | Rojer |
| 7,895,571 | B2 | 2/2011 | Fried et al. |
| 7,984,422 | B2 | 7/2011 | Graham |
| 2001/0051970 | A1* | 12/2001 | Webb .............................. 709/1 |
| 2002/0124244 | A1* | 9/2002 | Skaringer et al. ............. 717/171 |
| 2005/0021756 | A1* | 1/2005 | Grant ........................... 709/226 |
| 2005/0188384 | A1* | 8/2005 | Yogaratnam et al. ......... 719/331 |
| 2008/0046872 | A1* | 2/2008 | Cooper ......................... 717/140 |
| 2008/0271046 | A1* | 10/2008 | Lipton et al. .................. 719/311 |

OTHER PUBLICATIONS

Doernhoefer, "Surfing the Net for Software Engineering Notes", 2006.*

Bryant et al., "Object Oriented Software Specification in Programming Language Design and Implemention", IEEE, pp. 387-392, 1998.

Najumudheen et al., "A Dependence Graph Based Test Coverage Analysis Technique for Object Oriented Programs", IEEE, pp. 763-768, 2009.

Formica et al., "Inheritance Processing and Conflicts in Structural Generalization Hierarchies", AMC Computing Surveys, vol. 36, No. 3, pp. 263-290, 2004.

Snelting et al., "Understanding Class Hierarchies Using Concept Analysis", AMC Trans. on Prog. Lang. and Sys. vol. 22, No. 3, pp. 540-582, 2000.

Sakdavong et al., Configuration classes: An Object oriented paradigm for distributed programming, IEEE, pp. 200-209, 1995.

Hutchins, Eliminating distinctions of class using prototypes to model virtual classes, ACM OOPSLA pp. 1-19, 2006.

Lattner et al., Automatic pool allocation: Improving performance by controlling data structure layout in the heap, ACM PLDI, pp. 129-142, 2005.

Gottlob et al., Extending object oriented systems with roles, ACM Trans. on Inf. Sys. vol. 14, No. 3, pp. 268-296, 1996.

* cited by examiner

ASYNCHRONOUS LOAD OF SOURCE DEPENDENCIES

BACKGROUND OF THE INVENTION

Web page and web application developers use scripting languages, such as JavaScript™, to provide dynamic behavior in a web page. For example, in response to a user input a script embedded and/or referenced in a page may be run and the result used to modify the display, e.g., to display output data, or to provide other dynamic behavior. Scripts not embedded statically in a page typically are loaded as source files (e.g., a .js file in the case of JavaScript).

A JavaScript or other source file may define a function, such as a first-class function, that behaves or can be made to behave similarly to a software object written using a true object-oriented programming language (OOPL or OOL). Such an "object" referenced in a page may have one or more "dependencies"; i.e., to execute properly one or more other objects (source files) must be present and initialized. Using typical prior art approaches—for example, Dojo and other techniques that employ XMLHttpRequest or similar objects, commands, and/or interfaces—such source dependencies are loaded synchronously, leading to a serialization of loads which may result in a significantly slower user experience. For example, a page may wait to load and/or client side application or other code may wait to execute or continue executing until a required object and all its dependencies have been loaded.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Asynchronous loading of source dependencies is disclosed. An indication is received in the course of executing a script that a source file on which a current class or function depends is not available. Execution of remaining portions of the script, if any, that do not depend on the source file, continues, or other processing tasks are performed if no such portions remain, while the source file is loaded asynchronously. In some embodiments, import functions configured to provide callbacks to methods of a class definition function are used to enable source dependencies to be loaded asynchronously. In this way, the class definition function can complete execution from a JavaScript engine standpoint even if a superclass on which the class that is being defined depends is not yet available.

Figure 1:
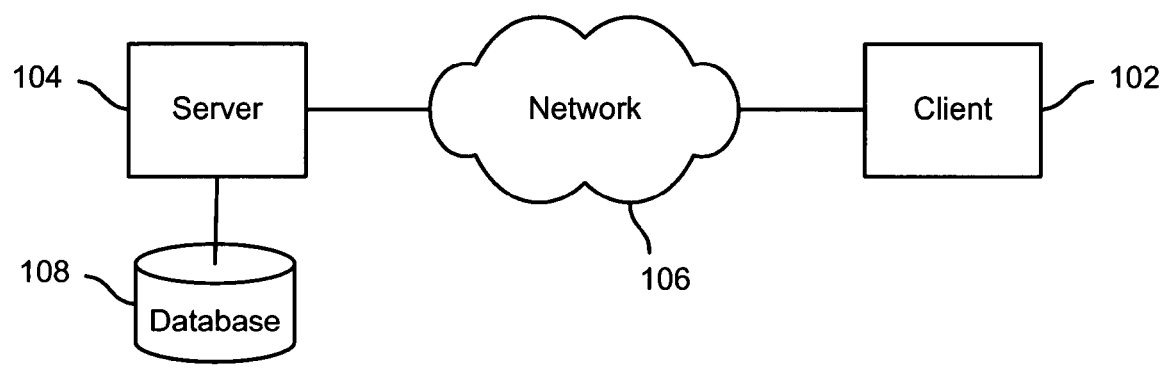
FIG. 1 illustrates an embodiment of a network environment.

FIG. 1 illustrates an embodiment of a network environment. In the example shown, a client 102 communicates with a server 104 via a network 106. Network 106 corresponds to any public or private network, such as a LAN, WAN, the Internet, etc., and facilitates the communication and interchange of information between client 102 and server 104. A database 108 is employed by server 104 to organize and store content. Client 102 may desire to access content and/or a software program or application available from server 104. For example, it may be desirable by client 102 to access a web page, web site, or a web-based application hosted by server 104. A page or other content hosted by server 104 may be requested by client 102, for example, by entering an associated URL into a browser, via an HTTP GET request, via an associated hyperlink, via a dedicated client-side program, etc. In response, in some embodiments, an at least initial definition associated with the desired page or other requested content is provided to client 102 by server 104. The page may include or reference one or more JavaScript scripts and/or source files, e.g., configured to provide dynamic behavior at the client. Such scripts may be stored in a database such as database 108 and/or in a file system on server 104, and client 102 may be required to retrieve such source files from the server 104 in order to obtain script code desired to be executed (or available for execution) at the client 102.

As previously mentioned, a web page may include or reference scripts that implement the logic or dynamic behavior associated with the page. Such scripts may be embedded within or referenced in the HTML file and typically are programmed using a procedural and/or prototype-based language, such as JavaScript. In some embodiments, it is useful to make a scripting language at least in part mimic aspects of object oriented behavior so that useful characteristics of the object oriented paradigm such as encapsulation and reuse can be acquired. This can be accomplished, for example, by defining appropriate declarations and function definitions using the syntax and constructs of the scripting language. Although JavaScript is described in the examples herein, similar techniques can be employed with any other appropriate scripting language. As used herein, a JavaScript "class" actually comprises a JavaScript function implemented in a manner that at least in part allows the function to mimic the functionality of a class in an object oriented paradigm. In some embodiments, the encapsulation of the scripts associated with a page and/or components of the page facilitates the separation of the display layer (e.g., the HTML elements) and the logic (e.g., the scripts) of the page. Since different groups of people may be associated with coding the display layer (e.g., graphic designers) and the logic (e.g., web developers) associated with a page, in some embodiments, it is useful to separate the logic from the display layer of the page as further described herein to reduce the risk of errors that may arise from multiple groups or people contributing to the coding of a particular page or an associated application.

Figure 2:
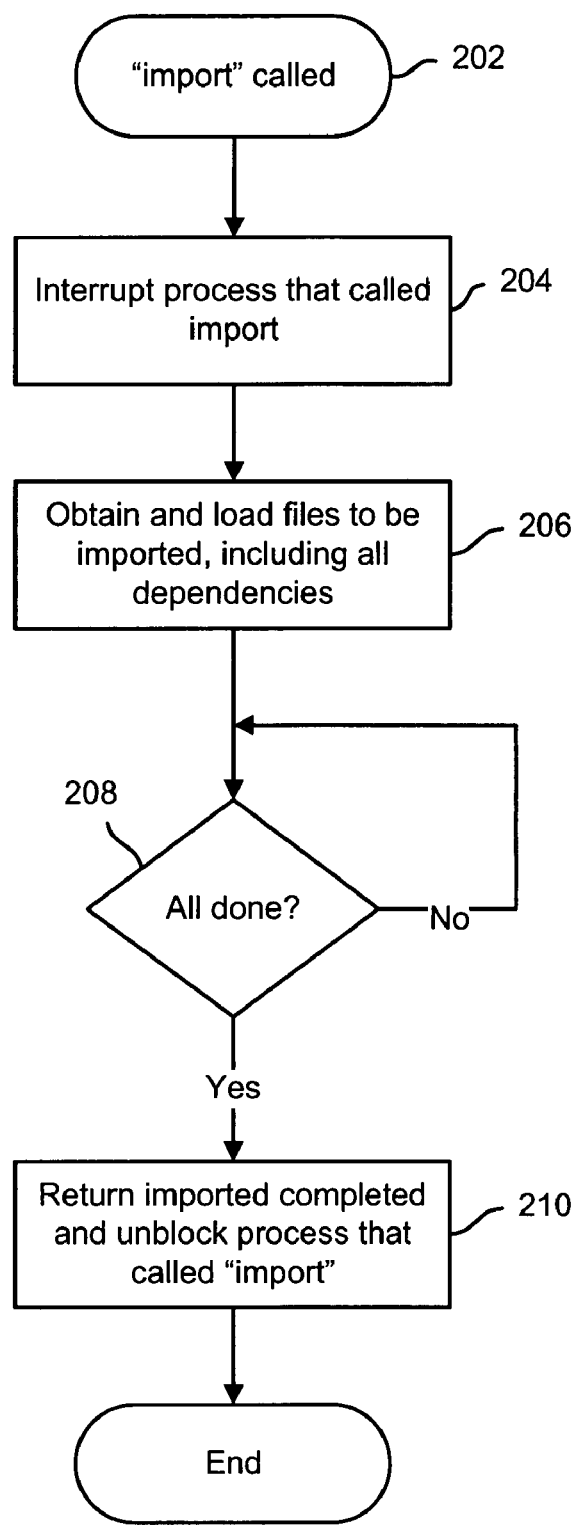
FIG. 2 is a flow chart illustrating an embodiment of a prior art process for loading source files.

FIG. 2 is a flow chart illustrating an embodiment of a prior art process for loading source files. A process such as the one shown in FIG. 2 may be used, for example, to retrieve from a server JavaScript (.js) source files referenced by or otherwise required to render a web page. An "import" or similar function is invoked to retrieve the required source file(s) (202). Other processing is blocked while the source file is retrieved and loaded (204). The required source files, including any required dependencies, are obtained and loaded (206). Once all required source files, included all dependencies, have been loaded (208), an indication is provided that the source file(s) have been retrieved and loaded and the previously blocked processing is allowed to resume (210). Under the prior art approaches, such as the one illustrated in FIG. 2, the processing required to actually render the page and/or to be more nearly ready to render the page, once the required source files have been retrieved and loaded, is blocked from executing until all the required source files, including all dependencies, have been loaded. As a result, if required source files have a lot of dependencies, or if the source files (e.g., super-classes) on which a required source file depends have further dependencies, etc., further processing of the page may be blocked while a serialization of source file loads occurs, until all required source files and dependencies have been loaded, only after which will the browser and/or script engine continue to perform the processing required to render the page.

Asynchronous loading of source file dependencies is disclosed. In some embodiments, a function is provided that programmatically generates at the client a class/function definition for a required class/function. The definition is based in some embodiments on a template, declaration, or other input provided by a web application developer. If a source dependency, e.g., a super-class, is encountered and determined not to be present, a method associated with the function that generates the class/function definition registers with the function tasked with importing the source file on which the class/function being defined depends for a callback to a method that will allow definition of the current class/function to resume once the source file on which it depends has been loaded. The callback technique allows other processing to continue while source dependencies are loaded. Once the source dependencies have been loaded, which implies that any source on which such source dependencies having been loaded, programmatic generation of the class/function definition is completed and the class/function is ready to execute. This approach allows other processing, e.g., rendering of portions of a page that are ready to be rendered, to continue while source dependencies are loaded asynchronously.

Figure 3:
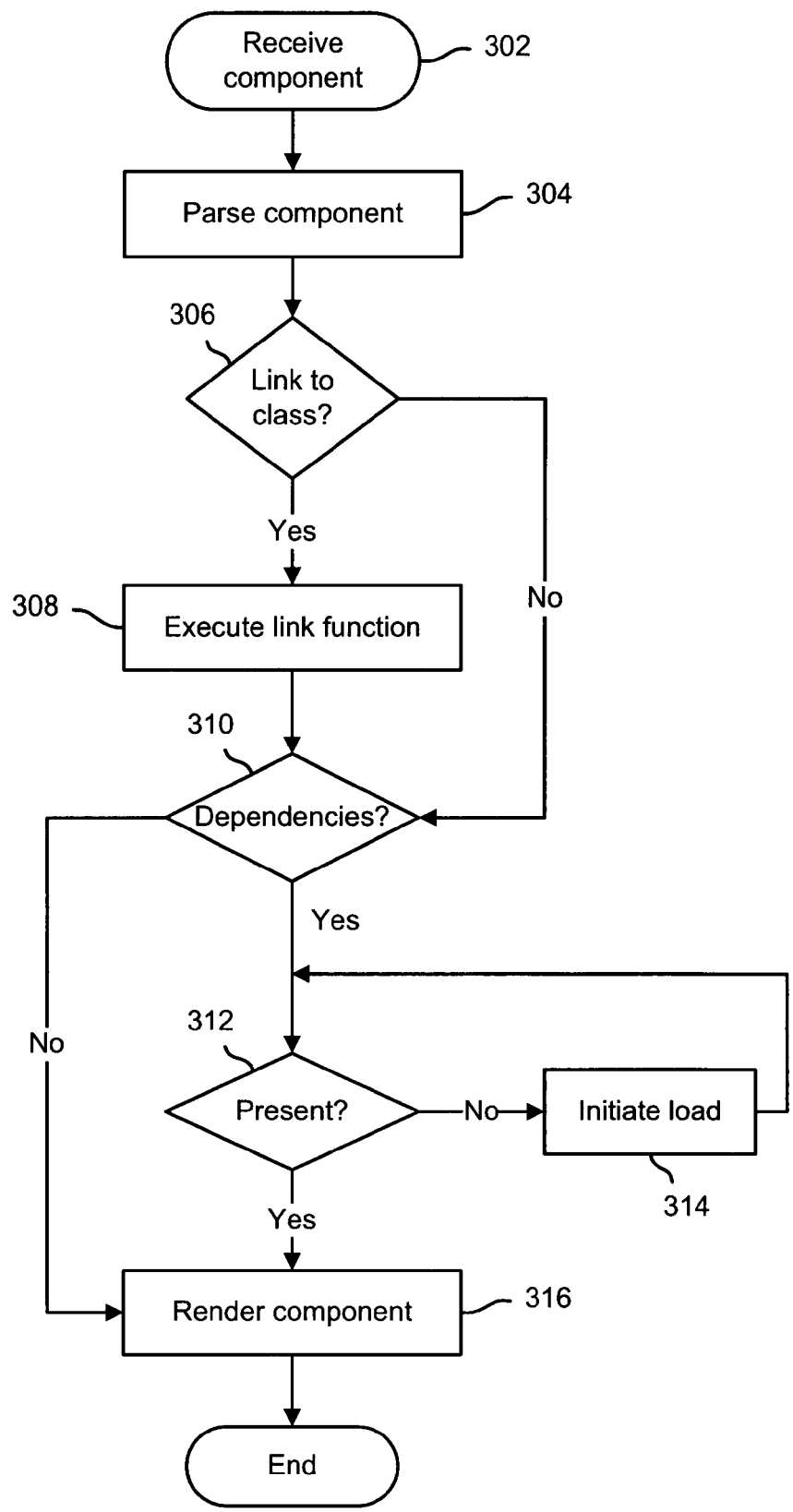
FIG. 3 is a flow chart illustrating an embodiment of a process for creating a page at a client, based on components retrieved from a server, including by loading asynchronously any required source files and/or dependencies thereof.

FIG. 3 is a flow chart illustrating an embodiment of a process for creating a page at a client, based on components retrieved from a server, including by loading asynchronously any required source files and/or dependencies thereof. In some embodiments, a component based approach is used to enable web pages to be created dynamically at the client, e.g., based on XHTML templates, associated logic (e.g., JavaScript classes/functions), and binding declarations indicating the relationship between logic objects (classes/functions) and the display elements with which they are associated. In some embodiments, logic included and/or referenced in a component, such as a JavaScript class/function, may be required to be retrieved from a server. In some cases, such required code may include source dependencies, e.g., a super-class, that may also have to be retrieved from the server to be able to render the component/page. In the example shown in FIG. 3, a component is received at the client, e.g., from a server in response to a request sent by the client to the server to obtain the component (302). The component is parsed (304). In some embodiments, the component comprises an XHTML or other file that comprises or references a script source (for example, a .js) file required to render the component. If the component includes a script tag or other declaration linking a source file to the component (306), a "Link" or import function is executed to cause the source file to be obtained and any classes/functions identified and/or declared in the source file to be loaded (308). If during the course of retrieving any such class/function it is determined that the class/function has a source dependency on a class/function or other code that is not present, the import function is called recursively for each such dependencies until all required files, including all dependencies, have been loaded and initialized. In the example shown, the component received at 302 may include or indicate a source dependency apart from source files linked explicitly to the component. For example, in some embodiments a component may include one or more binding declarations binding an identified class/function and/or one or more variables thereof to a display element associated with the component. If no such further dependencies are included in the component (310), or once any further source files on which the component depends have been loaded (310, 312, 314), the component is rendered (316). In some embodiments, rendering of the component begins only after the linked source file, if any, has been fully loaded and initialized. In some embodiments, asynchronous loading of source dependencies as described herein may make it possible to begin rendering a component, or portions thereof, or to begin or continue rendering other components or portions of the page, prior to all source files required for the component, including all dependencies, have been loaded and initialized.

Figure 4:
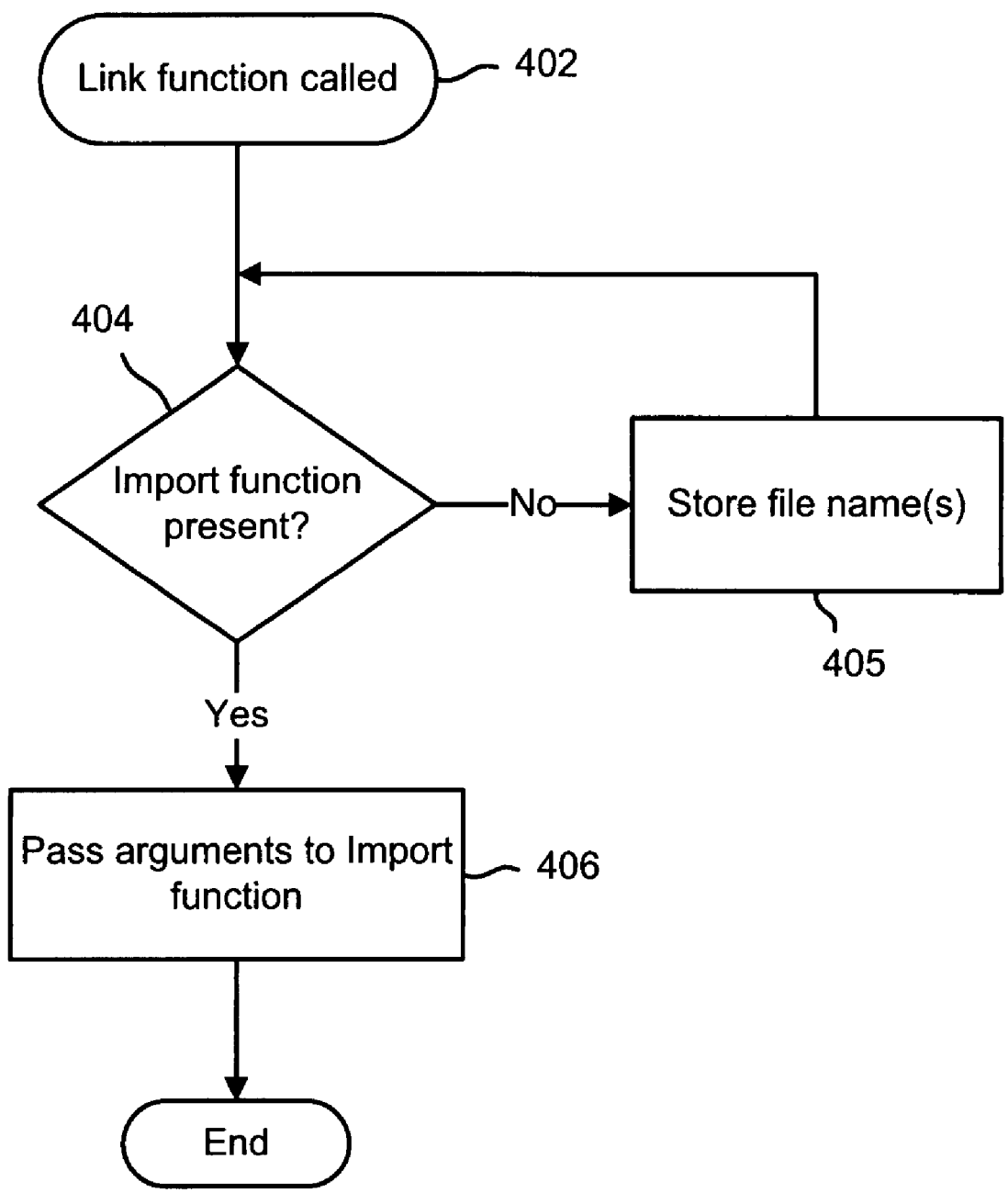
FIG. 4 is a flow chart illustrating an embodiment of a process for linking a source file to a component and/or page.

FIG. 4 is a flow chart illustrating an embodiment of a process for linking a source file to a component and/or page. In the example shown, a toolkit or other set of files loaded onto the client, e.g., downloaded to the client from a web application server, includes a predefined function, named "Link" in this example, configured to hold arguments to be passed to an "Import" function once that function has been downloaded to the client and initialized. This technique enables an initial page to begin loading and possibly being rendered while the linked file(s) is/are obtained, parsed, and executed, even if the "Import" function has not yet been downloaded and initialized. If the Link function is called (402), it determines whether the "Import" function is present (404). If so, the Link functions passes to the Import function the arguments provided originally to the Link function (406). Otherwise, the Link function stores the file name(s) passed to it as arguments (405) until such time as the Import function is available (404), at which time it passes the file name(s) to the Import function (406). In various embodiments, the Import function includes methods and/or other logic to determine whether required classes are already present at the client, and if not to obtain such classes from the server, including by loading any source dependencies asynchronously, as described herein.

Figure 5:
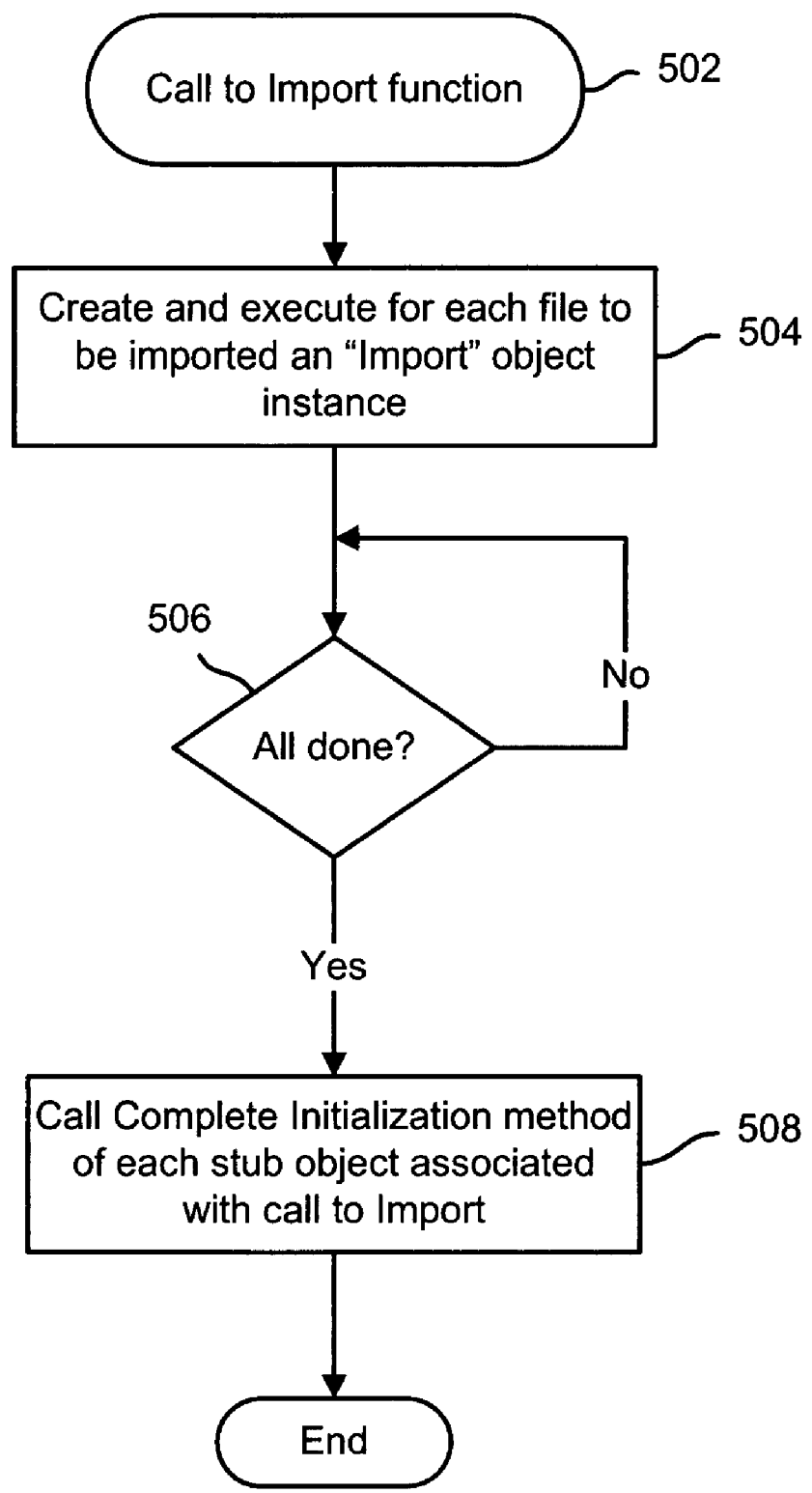
FIG. 5 is a flow chart illustrating an embodiment of a process for importing one or more source files.

FIG. 5 is a flow chart illustrating an embodiment of a process for importing one or more source files. A call to an import function, named "Import" in this example, is received (502). In various embodiments the call is made by a parser or engine executing code comprising a component associated with a page, by the Link function described above, by another instance of the import class/function, and/or directly or indirectly by the function described above that generates programmatically a class definition. In this example, the import function creates and executes for each required file to be imported a corresponding instance of the import class/function (504). Each instance so created is configured in some embodiments to retrieve the source file that the instance was created to retrieve. For example, in some embodiments, if the call "Import ("A", "B", and "C") were received (502), three separate instances of the import object/function would be created (504), one to retrieve file "A", a second to retrieve file "B", and a third to retrieve file "C". In some embodiments each instance is configured to report to the instance that created it once the source file (e.g., class/function) has been loaded and initialized. In the example shown in FIG. 5, once all required files have been determined to have been loaded and initialized (506), the import function notifies the respective stub objects (described more fully below) associated with each class associated with the source files that have been imported (508). In the example shown, the notification is in the form of a callback to a "complete initialization" method of such stub objects. In some embodiments, this callback indicates to the stub object (or other code configured to generate a class/function definition programmatically) that its required dependencies have been loaded and initialized and therefore are available to be used to complete the definition of the class/function.

Figure 6:
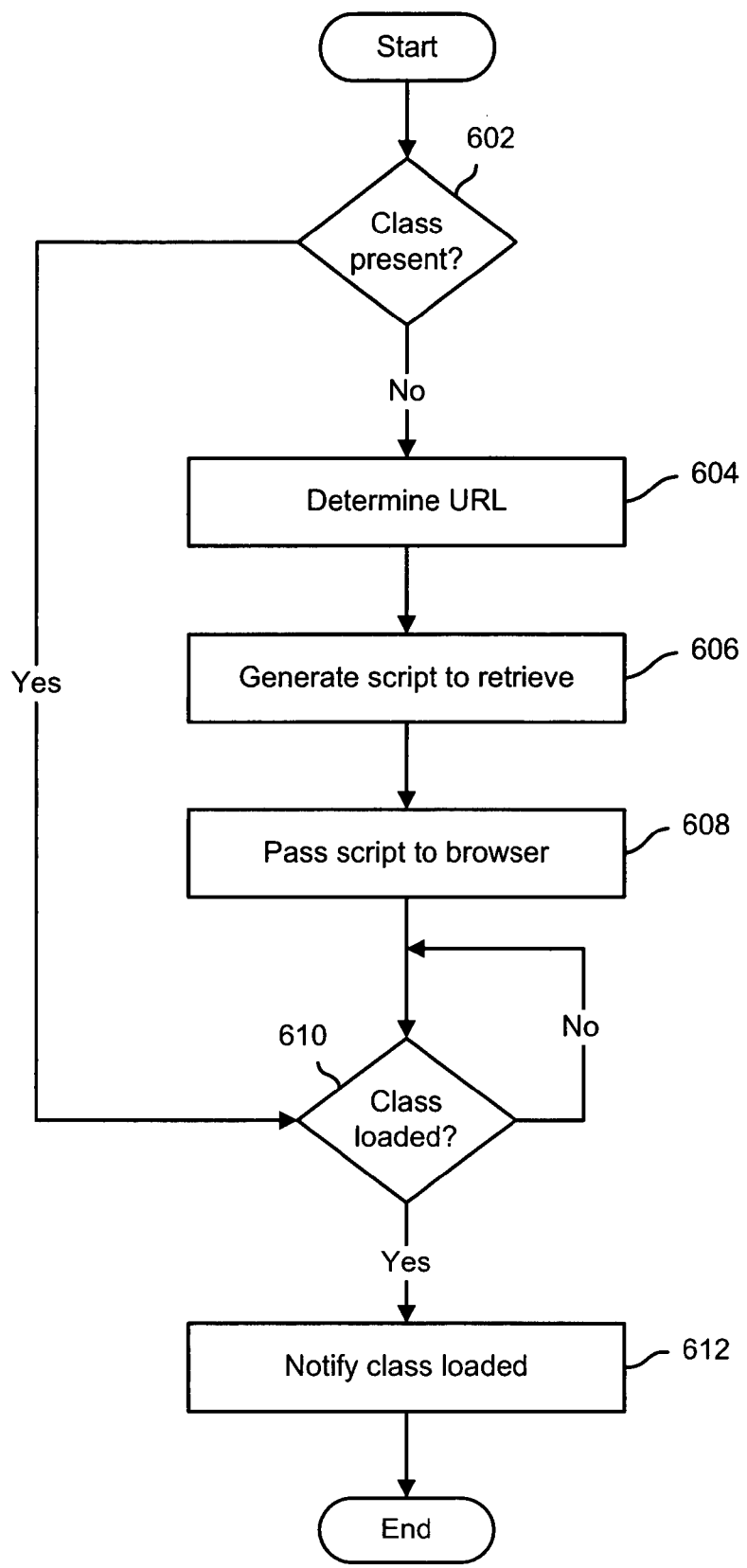
FIG. 6 is a flow chart illustrating an embodiment of a process for importing a source file.

FIG. 6 is a flow chart illustrating an embodiment of a process for importing a source file. In some embodiments, the process of FIG. 6 is implemented by an import object instance created to retrieve (if not already present) a particular source file, such as the instances described above in connection with 504 of FIG. 5. If the import object instance determines that the source file is not already present at the client (602), it determines a URL to be used to request the source file from the server (604). In some embodiments, the URL is determined based on a path to a root node on the server that is determined or inferred from files obtained previously from the server, such as an initial set of classes/functions passed to the client upon navigating to an initial page associated with a web application. Browser and/or associated script engine executable code configured to retrieve the source file is generated (606) and provided to the browser (608), which executes the script thereby causing the source file to be requested from the server, received, and parsed and executed by the script engine upon receipt. In various embodiments, the source file may include one or more of the following: a call to the import function described above, e.g., to prompt the load (if not already present) of any dependencies; one or more class/function definitions, one or more of which may include source dependencies; and/or one or more class/function definition templates or declarations, e.g., in a syntax as described below, usable to generate programmatically at the client a definition of a required class/function. Once the source file (a required class in this example) has been determined to have been loaded (610), or if it was determined at the outset that the class was already present at the client (602), a notification that the class has been loaded is sent (612), e.g., to a coordinating instance of the import function that was called to retrieve this and other related source files, as described above.

In some embodiments, a source file may include a class/function definition, or more precisely a template or set of declarations usable to generate such a definition programmatically at the client. In some embodiments, one or more functions and/or methods are provided and assigned names that are near variants of reserved words used in class-based object-oriented programming (OOP) languages to declare a class, invoke inheritance (i.e., identify a super or parent class), and define methods and variables to be implemented by the class. In some embodiments, the function/method names differ from the corresponding reserved word by one character, such as by adding or omitting a character, capitalizing an initial character, etc. For example, in some embodiments a function configured to generate programmatically at a client a class/function definition is named "Class" with a capital "C", "Extends" with a capital "E", and "Implements" with a capital "I". Another example is adding an underscore or other character to the beginning of a reserved word, such as "_class". In some embodiments, a function named "Class" is defined and returns a stub object to which methods named "Extends" and "Implements" are attached. Providing such a function enables a developer to declare a class/function, to be defined and implemented in a prototype-based language such as JavaScript, using a syntax that is similar to that used in class-based OOP languages with which the developer may be more familiar and/or which in any event may be easier or more convenient for the developer to use. For example, if a class/function named "Class" includes (or returns an object/function instance that includes) methods "Extend" for inheritance and "Implements" for defining class behaviors/variables, a developer can declare a class/function using syntax such as "Class( ).Extends( ).Implements({ })", with the argument of the Class function being the name of the class/function desired to be defined at the client, the argument of the Extends function/method indicating a class/function the parameters (methods and/or variables) of which it is desired that the class/function being defined inherit, and the arguments of the Implements method including the methods and variables to be implemented by the class/function to be defined programmatically at the client.

Figure 7:
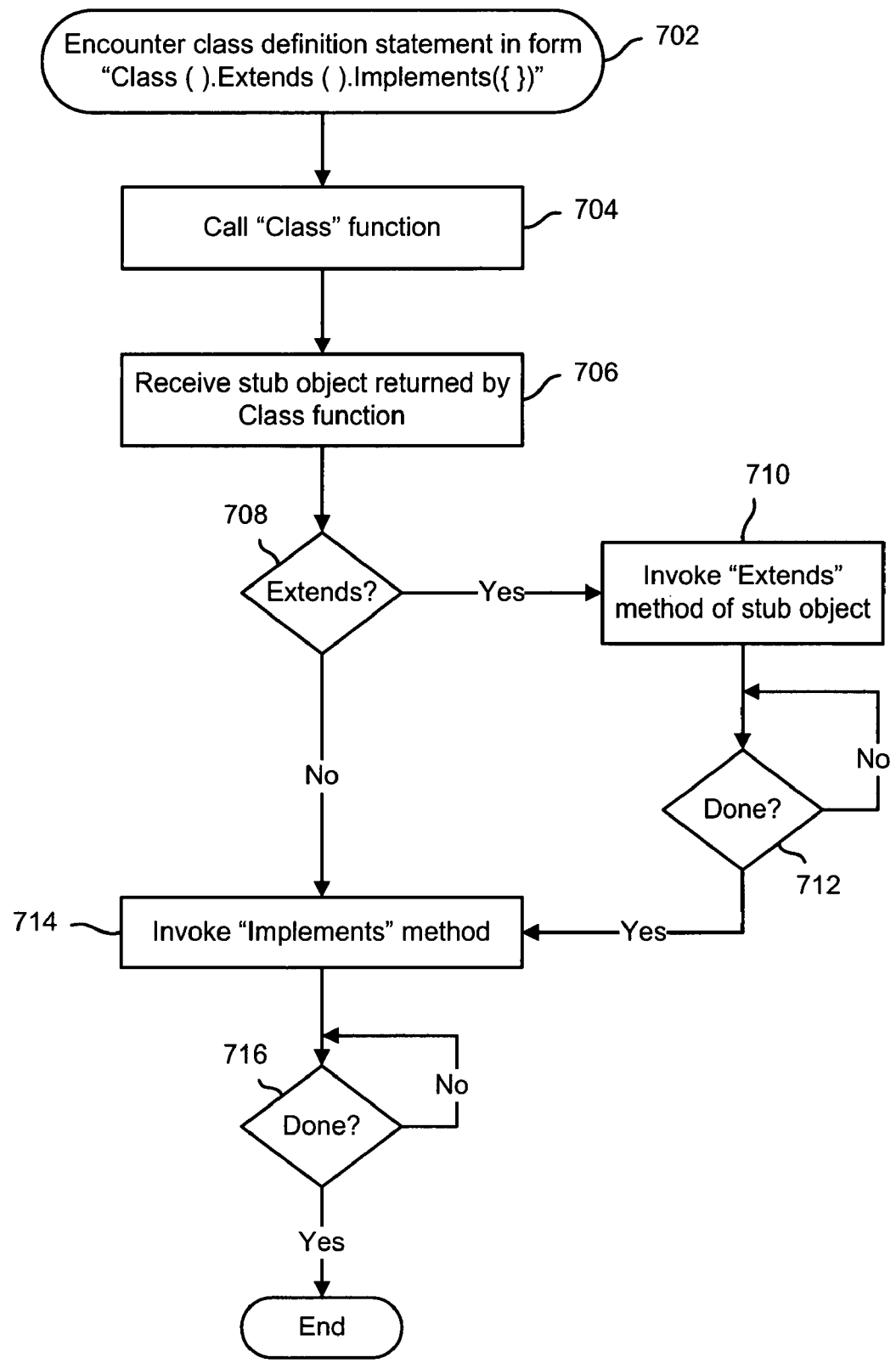
FIG. 7 is a flow chart illustrating an embodiment of a process for defining a class/function programmatically at a client.

FIG. 7 is a flow chart illustrating an embodiment of a process for defining a class/function programmatically at a client. A class/function declaration in a form such as "Class( ).Extends( ).Implements({ })" is encountered (702), e.g., in the course of parsing a component and/or a retrieved source file as described above. The "Class" function is called (704) and returns a stub object (706) having methods that include a method named "Extends" and a method named "Implements". If the class/function declaration included an "Extends" declaration (708), the "Extends" method of the stub object is executed (710) with respect to the super-class named in the argument of the "Extends" declaration. Once the "Extends" method and any associated methods have finished (712), indicating in this example that the super-class is fully loaded and the methods and variables of the super-class have been incorporated programmatically into the definition of the class/function being defined, the "Implements" method is invoked (714). In some embodiments, the "Implements" method iterates through the arguments provided to it and adds each to the class/function definition as a method/function or variable, as appropriate. Once the implements method (and/or any related or internal method) is done (716) the class/function definition is completed and the process ends. In some embodiments, once the Extends (if applicable) and Implements methods have finished, the stub tells the instance of the import class/function described above that the class/function is fully loaded and initialized and the class itself sends a load event which will triggers callbacks within other objects observing that class for the load event.

Figure 8:
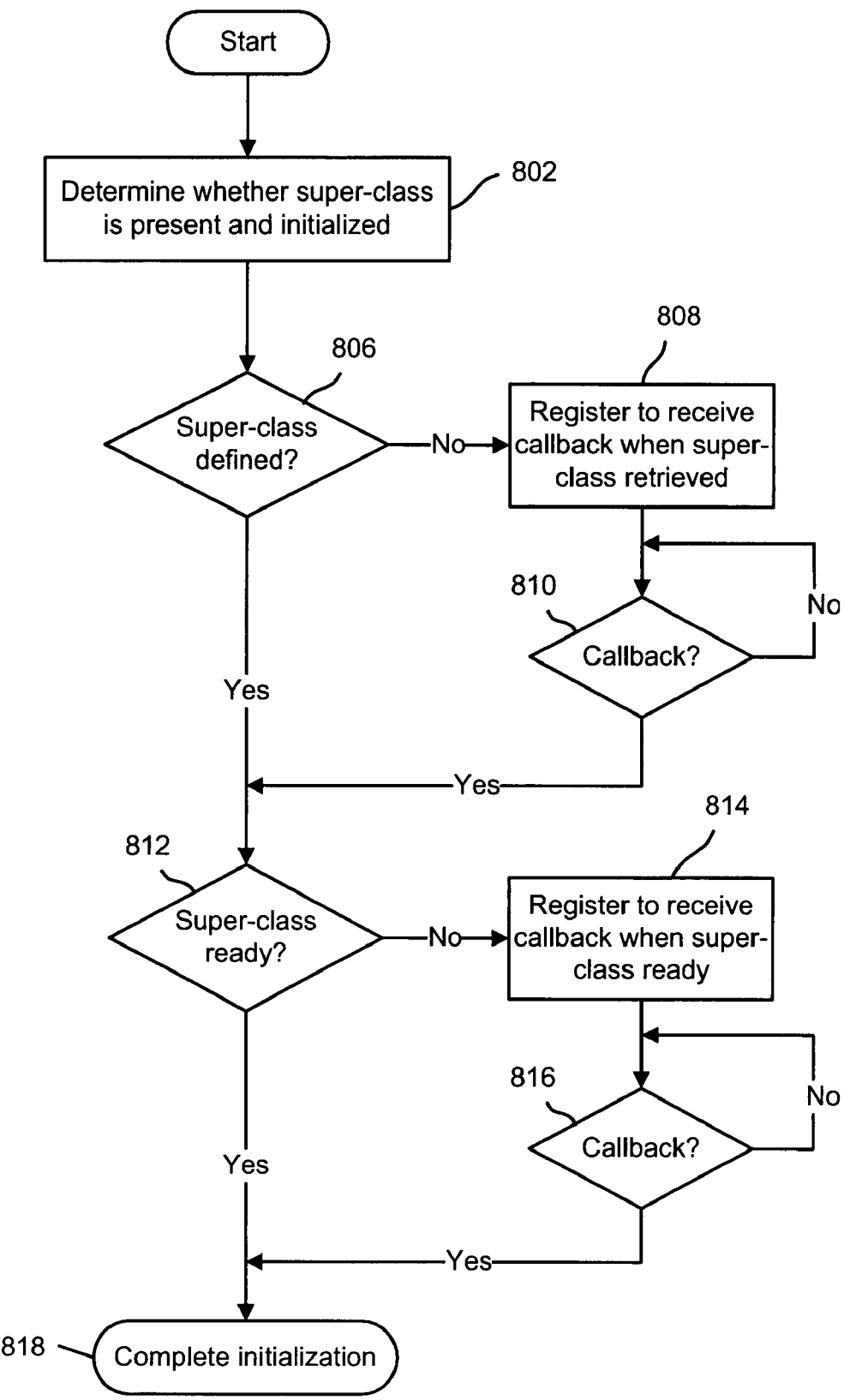
FIG. 8 is a flow chart illustrating an embodiment of a process for included inherited attributes into a class/function definition being generated programmatically at a client.

FIG. 8 is a flow chart illustrating an embodiment of a process for included inherited attributes into a class/function definition being generated programmatically at a client. In some embodiments, the process of FIG. 8 is implemented by an "Extends" method and/or related methods of a function such as the "Class" function described above. In the example shown, it is determined whether the super-class the name of which was provided as an argument to the Extends method is present at the client and initialized (802). If the super-class is defined at the client (806) and is fully loaded and initialized (812), initialization is completed (818). In some embodiments, if the super-class is determined to be present and ready initialization is completed by the stub itself calling its own "complete initialization" method. In some embodiments, when the "complete initialization" method is invoked and there is a super-class, the "complete initialization" method sets inheritance in place and passes the arguments of the "Implements" portion of the class definition to the "Implements" method of the stub. If the super-class is not yet defined at the client (806), the stub object registers itself with the import function instance configured to retrieve the super-class for a callback to an "import load callback" method of the stub object to be made when the import function determines that the super-class has been retrieved (808). Once the callback is received (810), it is determined whether the super-class is ready (812). If so, the "complete initialization" method is called by the stub itself, for example by the "import load callback" method that received the callback indicating that the super-class had been retrieved. If the super-class is determined to not be ready (812), for example because the super-class has a source dependency that is not yet satisfied, the stub registers itself to receive a callback when the super-class is ready (814), e.g., for a callback to its "complete initialization" method. Once the latter callback is received (816), initialization is completed.

In some embodiments, the use of callbacks as described above allows the function "Class" to be considered finished being executed, from a JavaScript engine perspective, even if the super-class (or some other source dependency) is not yet present and/or ready. This is so because if the super-class is not available the stub object registers for its callback from the import function while the JavaScript (or other script) engine finishes executing the instructions comprising the Class function and moves on, allowing the browser and JavaScript engine to continue with other tasks while the super-class is retrieved and initialized, which as noted above may require that classes on which the super-class depends to be retrieved, etc.

In some cases, a web application developer or other programmer may desire to invoke a method as it was defined prior to being overwritten in a current function/class. In class-based OOP environments, this typically is done by invoking the "super" method. Since class-based OOP languages have a native concept and understanding of a class hierarchy, it is easy for the super method to find and execute the super implementation of the method. However, in a language that instead provides prototype-based inheritance, such as JavaScript, there is no class hierarchy and therefore no native ability to invoke a super implementation of an overwritten method. Instead, a programmer must be aware of the hierarchy of classes/functions he/she has created and must include manually in a function definition, for example, a pointer to a super implementation of a method he/she wishes to invoke. Providing a function that generates and inserts such a pointer programmatically is disclosed.

Figure 9:
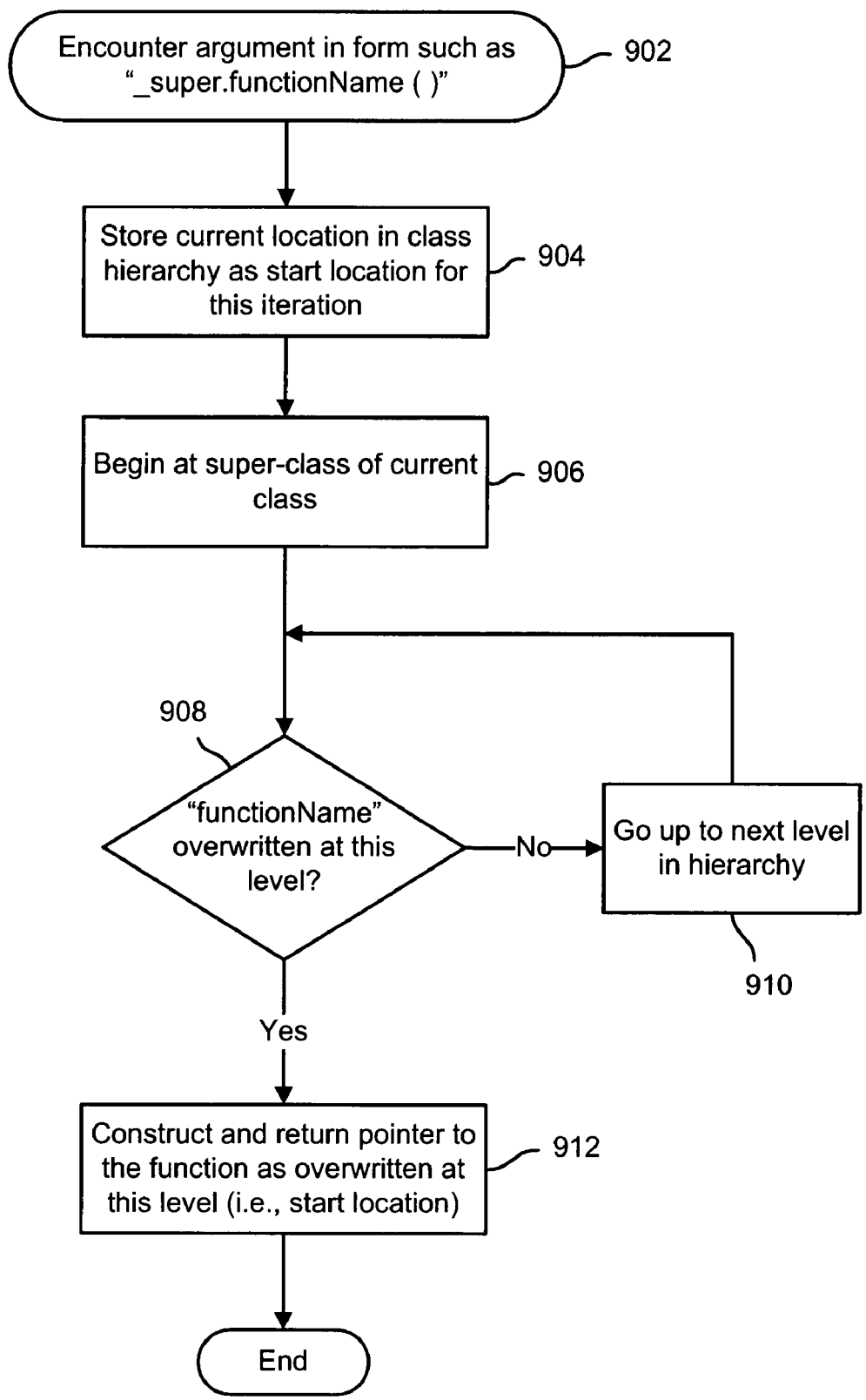
FIG. 9 is a flow chart illustrating an embodiment of a process for generating programmatically a pointer to a super implementation of an overwritten method.

FIG. 9 is a flow chart illustrating an embodiment of a process for generating programmatically a pointer to a super implementation of an overwritten method. In the example shown, an argument (e.g., a method or function declaration) in a form such as "_super.functionName( )" is encountered (902). In some embodiments, "_super" is a function configured to implement the remaining steps of the process of FIG. 9. In various embodiments the function has a name that is a near variant of the reserved word super, e.g., an additional character; an omitted character; an underscore character preceding the word "super"; capitalization of a letter in the word "super"; and capitalization of the first letter in the word "super". A current location in the "class" hierarchy, e.g., the current function name or other identifier, is stored as the start location for the current iteration of the process of FIG. 9, e.g., the current iteration of the function "_super" (904). Starting at the super-class of the current class (906), it is determined whether the function/method was last overwritten (or first defined, if not previously overwritten) at this level (908). If not, processing continues at the next level up from the current level, i.e., the super-class of the class just examined (910). Once the class/level in which the function/method was last overwritten (or first defined, if applicable) (908), a pointer from the starting point stored at 904 to the super implementation is constructed (912). In some embodiments, the pointer is inserted programmatically in the definition and/or in an instance of the function/method in which the "_super" function/method was invoked, for example in place of the function/method name "_super". This approach relieves the programmer of the need to construct manually a pointer to the super implementation, which consumes time and may lead to error, particularly in more complex applications that involve many functions and/or a complicated hierarchy.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of loading source files, comprising:
receiving, in the course of executing a script, an indication that a source file on which a current class or function depends is not available;
continuing execution of remaining portions of the script, if any, that do not depend on the source file, or continuing on to other processing tasks if no such portions remain, while the source file is loaded asynchronously;
receiving an indication that the source file has been loaded; and
executing a portion of the script that depends on the source file; and
wherein the portion of the script that depends on the source file comprises a method that includes programmatically in a definition of the current class or function the methods and variables of a super-class with which the source file is associated.

2. The method as recited in claim 1, wherein the indication that the source file is not available comprises an indication that the source file is not available at a client.

3. The method as recited in claim 1, wherein the source file is loaded from a server.

4. The method as recited in claim 1, wherein the source file comprises a super-class or function of the current class or function.

5. The method as recited in claim 1, wherein the source file comprises a first source file and further comprising receiving, in the course of loading the first source file, an indication that the first source file depends on a second source file that is not available.

6. The method as recited in claim 1, wherein the indication that the source file is not available comprises an indication that the source file has not been retrieved from a server.

7. The method as recited in claim 1, wherein the indication that the source file is not available comprises an indication that the source file has been retrieved from a server but has not been initialized.

8. The method as recited in claim 1, wherein the indication that the source file has been loaded comprises a callback.

9. The method as recited in claim 8, wherein the callback is triggered by a load event.

10. The method as recited in claim 8, wherein the callback is sent by an import function configured to retrieve the source file.

11. The method as recited in claim 8, further comprising registering for the callback.

12. The method as recited in claim 8, wherein the callback is to a method of an object or function configured to generate programmatically a definition for the current class or function.

13. The method as recited in claim 1, wherein the script comprises a function configured to generate programmatically a definition of the current class or function.

14. A client computer system, comprising:
a communication interface; and
a processor coupled to the communication interface and configured to:
receive, in the course of executing a script, an indication that a source file on which a current class or function depends is not available;
continue execution of remaining portions of the script, if any, that do not depend on the source file, or continuing on to other processing tasks if no such portions remain, while the source file is loaded asynchronously from a server via the communication interface;
receive an indication that the source file has been loaded; and
execute a portion of the script that depends on the source file; and
wherein the portion of the script that depends on the source file comprises a method that includes programmatically in a definition of the current class or function the methods and variables of a super-class with which the source file is associated.

15. The system as recited in claim 14, wherein the processor is further configured to request the source file from the server.

16. The system as recited in claim 14, wherein the processor is configured to execute the script in the context of a browser software running on the client computer system.

17. The system as recited in claim 14, wherein the indication that the source file is not available comprises an indication that the source file is not available at the client computer system.

18. The system as recited in claim 14, wherein the source file comprises a super-class or function of the current class or function.

19. The system as recited in claim 14, wherein the source file comprises a first source file and further comprising receiving, in the course of loading the first source file, an indication that the first source file depends on a second source file that is not available.

20. The system as recited in claim 14, wherein the indication that the source file is not available comprises an indication that the source file has not been retrieved from the server.

21. The system as recited in claim 14, wherein the indication that the source file is not available comprises an indication that the source file has been retrieved from the server but has not been initialized.

22. The system as recited in claim 14, wherein the indication that the source file has been loaded comprises a callback.

23. The system as recited in claim 22, wherein the callback is triggered by a load event.

24. The system as recited in claim 22, wherein the callback is sent by an import function configured to retrieve the source file.

25. The system as recited in claim 22, further comprising registering for the callback.

26. The system as recited in claim 22, wherein the callback is to a method of an object or function configured to generate programmatically a definition for the current class or function.

27. The system as recited in claim 14, wherein the script comprises a function configured to generate programmatically a definition of the current class or function.

28. A computer program product for loading source files, the computer program product being embodied on a non-transitory computer readable medium and comprising computer instructions for:
receiving, in the course of executing a script, an indication that a source file on which a current class or function depends is not available;
continuing execution of remaining portions of the script, if any, that do not depend on the source file, or continuing on to other processing tasks if no such portions remain, while the source file is loaded asynchronously;
receiving an indication that the source file has been loaded; and
executing a portion of the script that depends on the source file; and
wherein the portion of the script that depends on the source file comprises a method that includes programmatically in a definition of the current class or function the methods and variables of a super-class with which the source file is associated.

29. The computer program product as recited in claim 28, wherein the indication that the source file is not available comprises an indication that the source file is not available at a client.

30. The computer program product as recited in claim 28, wherein the source file comprises a super-class or function of the current class or function.

31. The computer program product as recited in claim 28, wherein the source file comprises a first source file and further comprising receiving, in the course of loading the first source file, an indication that the first source file depends on a second source file that is not available.

32. The computer program product as recited in claim 28, wherein the indication that the source file is not available comprises an indication that the source file has not been retrieved from a server.

33. The computer program product as recited in claim 28, wherein the indication that the source file is not available comprises an indication that the source file has been retrieved from a server but has not been initialized.

34. The computer program product as recited in claim 28, wherein the indication that the source file has been loaded comprises a callback.

35. The computer program product as recited in claim 34, wherein the callback is triggered by a load event.

36. The computer program product as recited in claim 34, wherein the callback is sent by an import function configured to retrieve the source file.

37. The computer program product as recited in claim 34, further comprising registering for the callback.

38. The computer program product as recited in claim 34, wherein the callback is to a method of an object or function configured to generate programmatically a definition for the current class or function.

39. The computer program product as recited in claim 28, wherein the script comprises a function configured to generate programmatically a definition of the current class or function.

* * * * *